United States Patent [19]
Haller et al.

[11] Patent Number: 5,152,040
[45] Date of Patent: Oct. 6, 1992

[54] DEVICE FOR FORMING A PLURALITY OF DIMPLES IN A CYLINDRICAL WALL OF A COUNTERBORE PROVIDED IN A COMPONENT

[75] Inventors: Hans Haller, Mannheim; Klaus Schreiner, Speyer, both of Fed. Rep. of Germany

[73] Assignee: ABB Reaktor GmbH, Mannheim, Fed. Rep. of Germany

[21] Appl. No.: 770,126

[22] Filed: Oct. 2, 1991

[30] Foreign Application Priority Data

Oct. 2, 1990 [DE] Fed. Rep. of Germany ....... 4031060

[51] Int. Cl.$^5$ ........................... B23Q 5/22; B23C 3/28
[52] U.S. Cl. ........................................ 29/53; 51/290; 409/143
[58] Field of Search ............... 29/33 T, 50, 54, 55, 29/40; 409/143, 190, 203, 191, 192, 230; 51/331, 345, 348, 347, 350, 227 R, 290

[56] References Cited

U.S. PATENT DOCUMENTS

| | | | |
|---|---|---|---|
| 3,403,597 | 10/1968 | Beckman et al. | 409/143 |
| 4,116,110 | 9/1978 | Dines | 409/143 |
| 4,429,445 | 2/1984 | Fuminier | 29/33 T |
| 4,527,357 | 7/1985 | Shank | 51/290 X |
| 4,826,369 | 5/1989 | Bennett | 409/230 X |

FOREIGN PATENT DOCUMENTS

| | | | |
|---|---|---|---|
| 307823 | 3/1989 | European Pat. Off. | 409/191 |
| 284624 | 11/1990 | Fed. Rep. of Germany | 409/143 |
| 854610 | 8/1981 | U.S.S.R. | 409/143 |

Primary Examiner—William Briggs
Attorney, Agent, or Firm—Herbert L. Lerner; Laurence A. Greenberg

[57] ABSTRACT

Heretofore, dimples or recesses that were distributed over the periphery of a cylindrical wall of a counterbore in a component had to be formed or inserted one after the other, which required complicated positioning work. According to the invention, in order to simultaneously form all of the dimples with a simple positioning device, a deflection body is provided through which at least two milling spindles pass in a planet-like disposition relative to a central control rod. The deflection body is connected to a centering piece facing the counterbore and to an intermediate piece facing away from the counterbore. The intermediate piece in turn forms a type of cylinder/piston connection with a gear housing. Each milling spindle is connected to an output shaft of a gear housing by a flexible shaft that is axially movably guided in between. A relative movement takes place between the housing and the intermediate piece in the course of a predeterminable stroke after the centering piece contacts the base surface of the counterbore. The control rod also performs the relative movement by simultaneously moving the milling spindles radially outwardly in the vicinity of the deflection body.

7 Claims, 4 Drawing Sheets

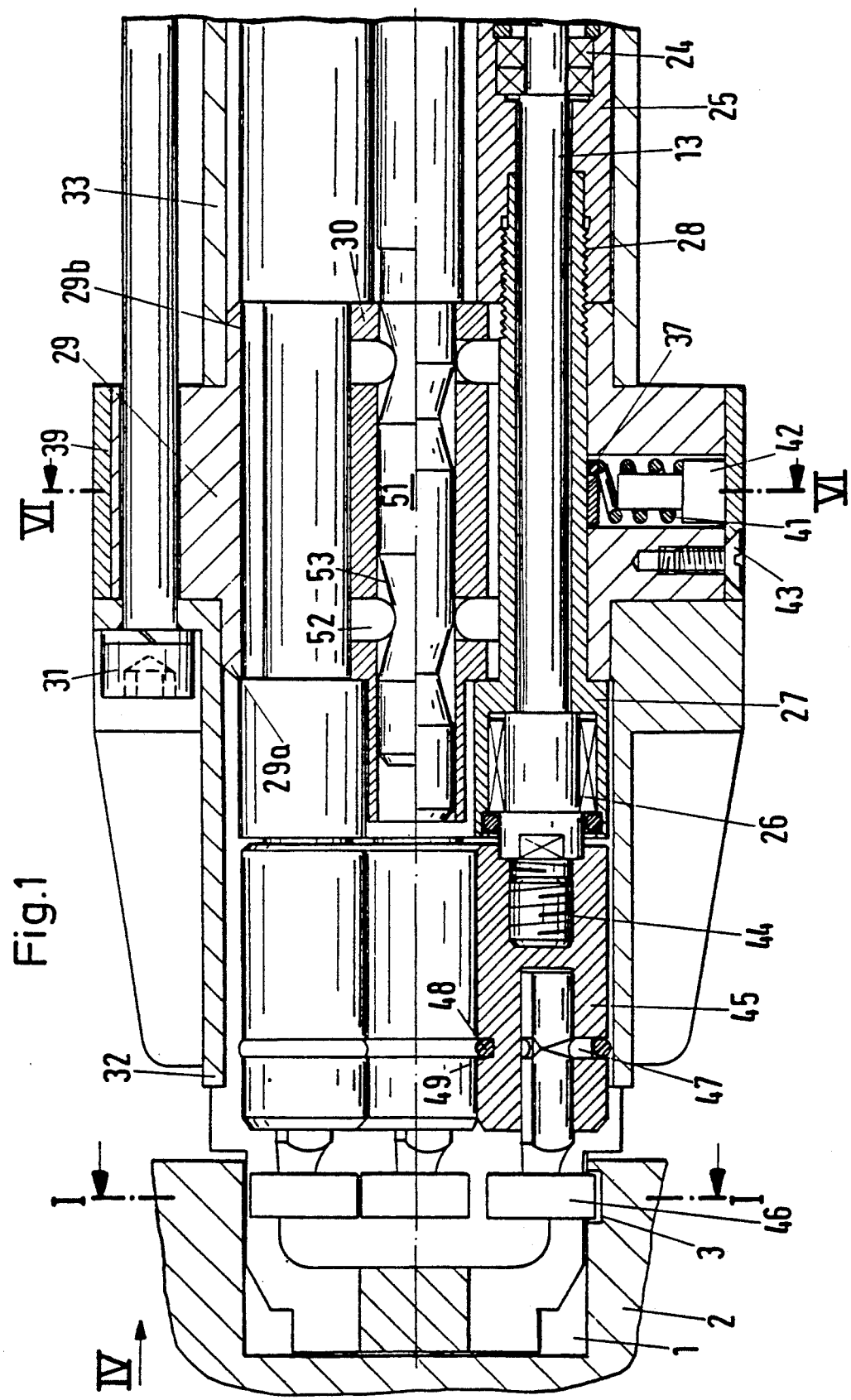

DEVICE FOR FORMING A PLURALITY OF DIMPLES IN A CYLINDRICAL WALL OF A COUNTERBORE PROVIDED IN A COMPONENT

The invention relates to a device for forming or inserting a plurality of dimples in a cylindrical wall of a counterbore provided in a component, including a milling spindle carrying a milling cutter and being rotatable by a drive shaft, and drive means for performing a linear and/or radial movement of the milling spindle.

In a generally known device of that type, individual positions where dimples have to be formed in the periphery have to be approached one after the other by the milling cutter. Furthermore, such a time-consuming and inaccurate positioning (with angle errors) also requires a rotating movement of a holding shank parallel to the inner wall surface of the counterbore in order to reach a predetermined location distributed about the periphery, together with a complicated position indicator, for forming the respective dimple.

It is accordingly an object of the invention to provide a device for forming a plurality of dimples in a cylindrical wall of a counterbore provided in a component, which overcomes the hereinafore-mentioned disadvantages of the heretofore-known devices of this general type, which uses simple positioning means and which enables all of the dimples distributed over the periphery of the cylindrical wall of the counterbore to be formed simultaneously.

With the foregoing and other objects in view there is provided, in accordance with the invention, a device for forming or inserting a plurality of dimples or recesses in a cylindrical wall, comprising a deflection body, a central control rod having a first end and a second free end, milling spindles to be rotated by a drive shaft, the milling spindles being disposed planet-like relative to the central control rod and passing through the deflection body, the milling spindles corresponding in number to dimples to be simultaneously formed in a cylindrical wall of a counterbore in a component having a base surface of the counterbore, milling cutters disposed on the milling spindles, a centering piece facing the counterbore and being connected to the deflection body, an intermediate piece facing away from the counterbore and being connected to the deflection body, a gear housing having a piston/cylinder type connection with the intermediate piece and having an output shaft, the first end of the control rod being fastened to the gear housing, the second free end of the control rod projecting into the deflection body, axially movably guided flexible shafts connecting the milling spindles to the output shaft of the gear housing, bearing sleeves carrying the milling spindles and being radially movably mounted in the deflection body, and drive means performing a linear and/or radial movement of the milling spindle, for axially displacing the control rod relative to the deflection body with an axial relative movement between the gear housing and the intermediate piece in the course of a predeterminable stroke, after the centering piece contacts or comes down on the base surface of the counterbore, and simultaneously moving the milling spindles radially outwardly in the vicinity of the deflection body.

In each case, the gear unit sets all of the milling spindles together with the milling cutters fastened thereto in rotary movement. During the rotary movement, a linear displacement of the gear housing takes place and a feeding movement of the milling cutters takes place in the radial direction through the control rod, until the predeterminable depth of the dimples is reached. The flexible couplings permit deflection of the milling spindles.

In accordance with another feature of the invention, there is provided a central gear shaft connected to a coupling piece leading to a rotary or linear drive for the device.

In accordance with a further feature of the invention, the stroke between the housing and the intermediate piece is limited by a stop, and the stroke movement takes place while overcoming a counterforce. The counterforce produces automatic retraction of the gear housing and thus also of the control rod into their initial position.

In accordance with an added feature of the invention, the control rod has at least one annular groove with a V-shaped cross section formed therein, a number of cams corresponding to the number of annular grooves are each associated with a bearing sleeve of the milling spindle, and the cams pass radially through a cage guiding the control rod. With this compact type of construction, a reliable control of the sequence of movements is provided in the most restricted space.

In accordance with an additional feature of the invention, in order to achieve exact guidance, the deflection body has radial guides for accommodating the bearing sleeves, and a ball-bearing is associated with the bearing sleeve serving as axial-securing means.

In accordance with a concomitant feature of the invention, the spring-mounted thrust pieces are associated with the deflection body, and each of the thrust pieces are disposed opposite an abutment. The spring mounting produces an exact return movement of the milling spindles and thus of the milling cutters into their initial position.

Other features which are considered as characteristic for the invention are set forth in the appended claims.

Although the invention is illustrated and described herein as embodied in a device for forming a plurality of dimples in a cylindrical wall of a counterbore provided in a component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, longitudinal-sectional view of a part of a device facing a counterbore;

Figure 1A:
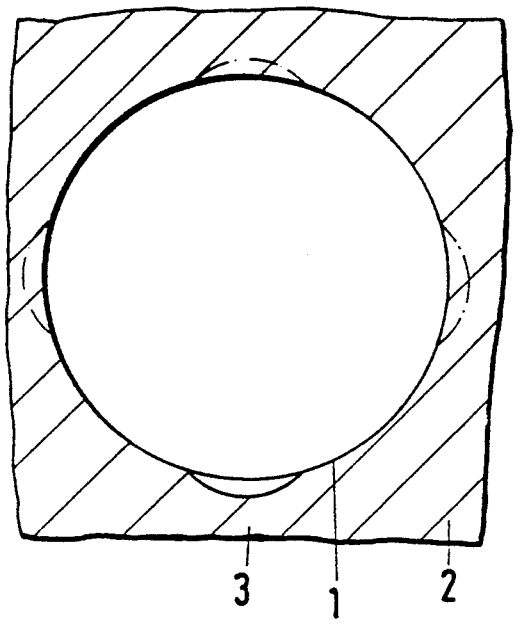
FIG. 1a is a fragmentary, sectional view through the component having the counterbore, which is taken along a line I—I in FIG. 1 in the direction of the arrows.
Figure 2:
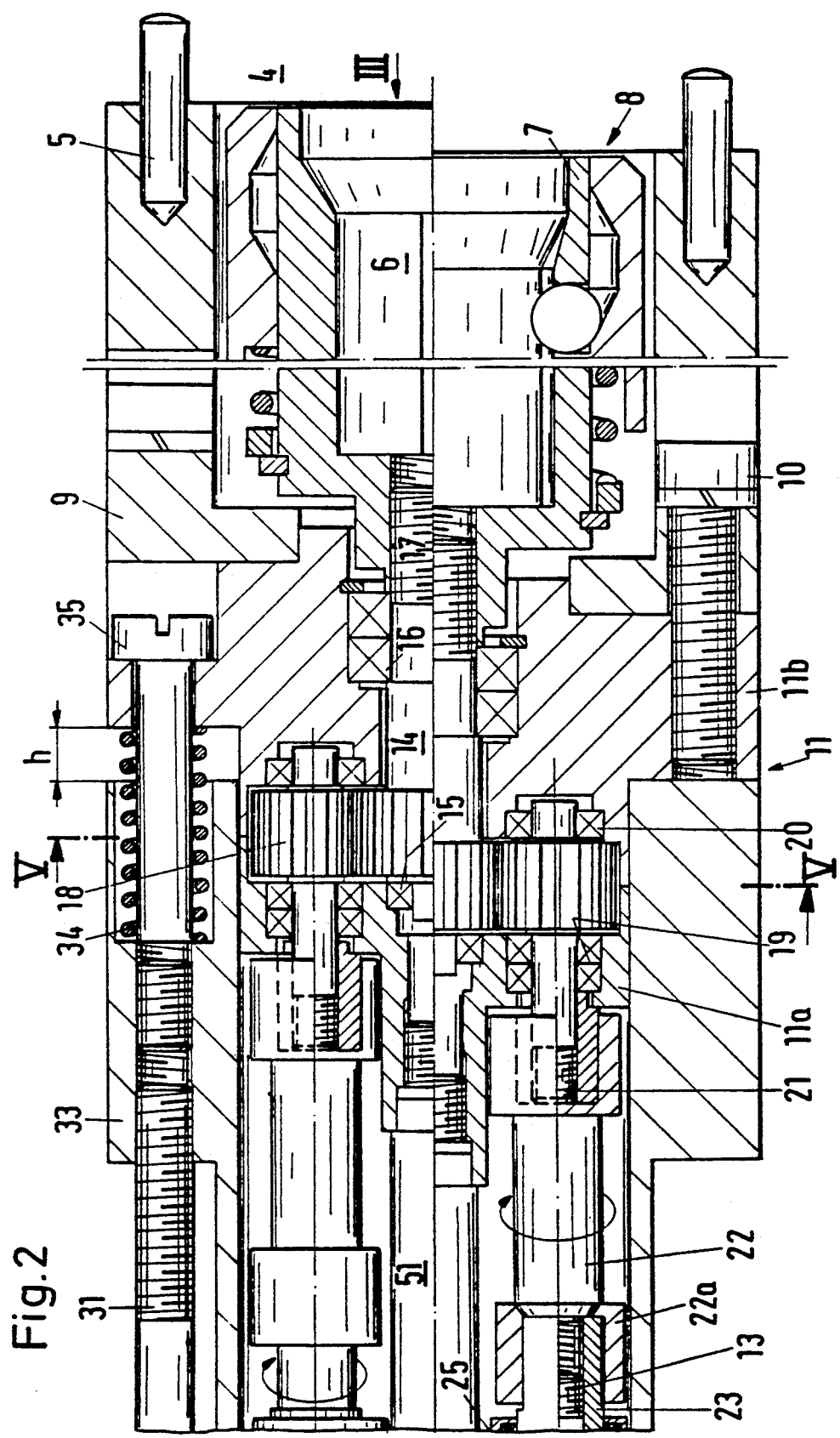
FIG. 2 is a fragmentary, longitudinal-sectional view of the remaining part of the device according to FIG. 1.

Referring now to the figures of the drawing in detail and first, particularly, to FIG. 1 thereof, there is seen a part of a device facing a counterbore 1 of a component 2, while FIG. 2 is a continuation of FIG. 1 showing the remaining part of the device. As is revealed in FIG. 1a, which shows a sectional representation along the line I—I in FIG. 1 that is taken merely through the component 2, the device serves to form dimples 3 in the wall of the counterbore 1, or more precisely in the wall of the component 2 at the counterbore 1. These dimples, which are recesses or small grooves that are about 3 mm deep serve, for example, to secure a screw to be disposed in the bore 1. In the exemplary embodiment, four dimples which are distributed over the periphery at a distance of 90° are inserted or formed. In FIGS. 1 and 2, the top sectional half shows the device before the start of the milling operation and the bottom sectional half shows the end of the milling operation, with the milling cutter having just reached the required dimple depth.

Figure 3:
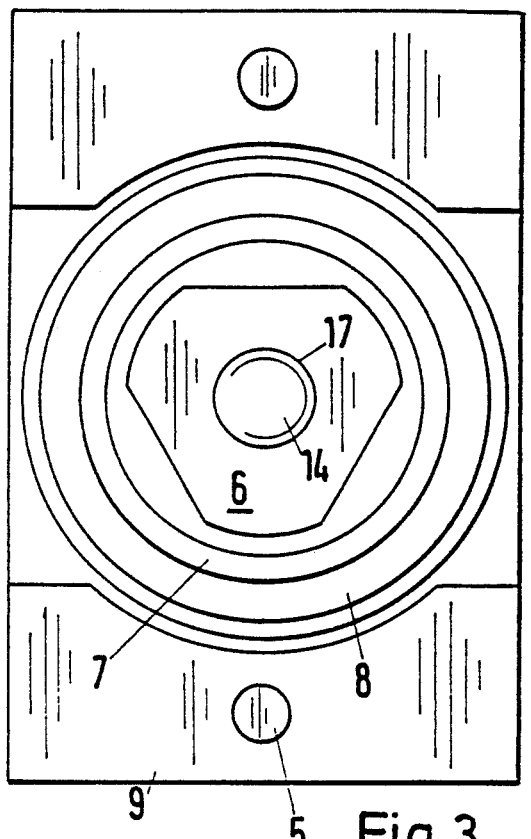
FIG. 3 is an elevation view as seen along the direction of an arrow III in FIG. 2.
Figure 5:
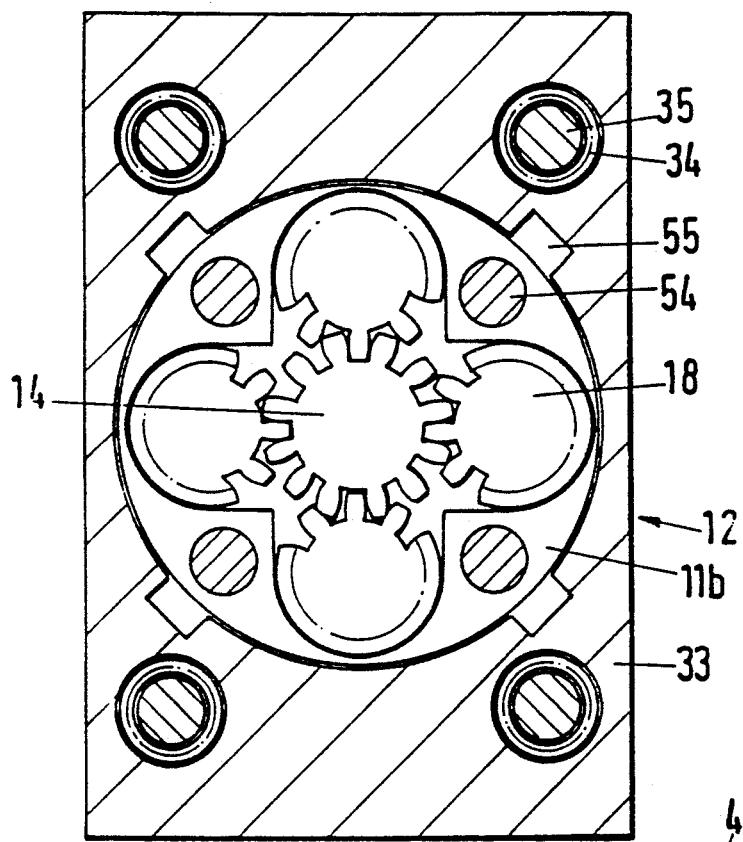
FIG. 5 is a sectional view taken along line V—V in FIG. 2, in the direction of the arrows.
Figure 6:
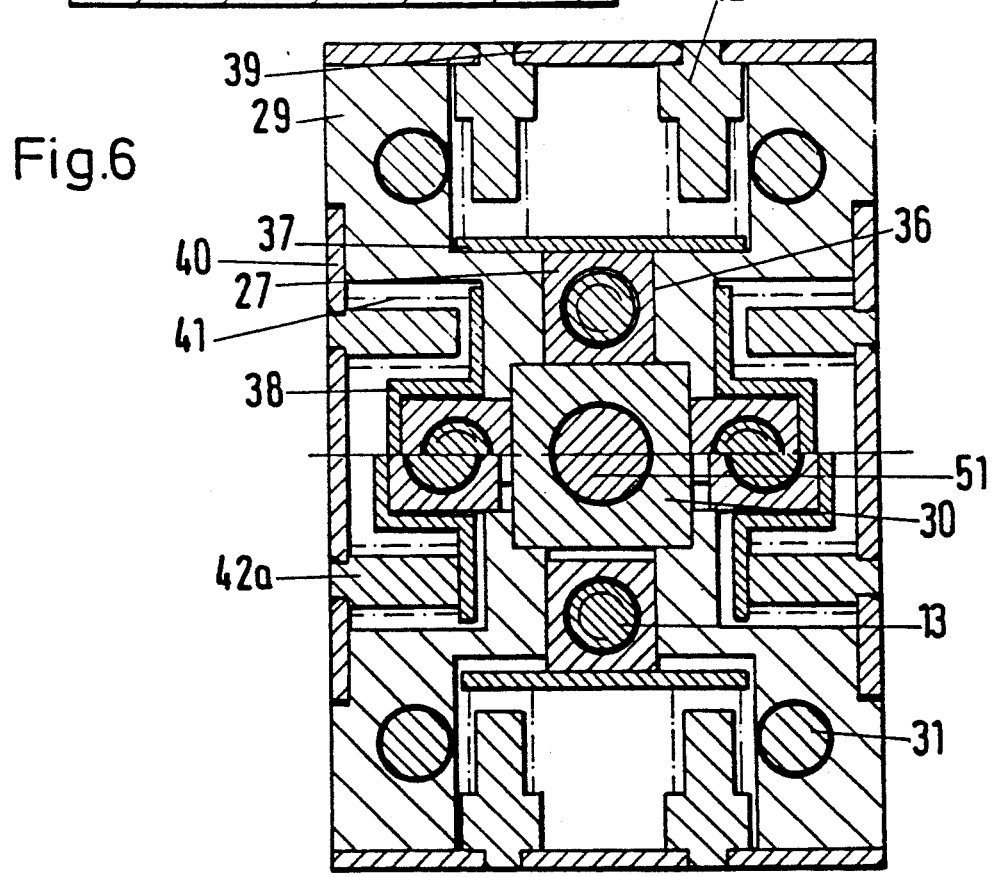
FIG. 6 is a sectional view taken along the line VI—VI in FIG. 1, in the direction of the arrows.

As is indicated by phantom lines at the right-hand margin of FIG. 2, the device is carried by drive means 4 which are provided with bores for receiving centering pins 5 and with a journal which engages in a locating bore 6 in a coupling piece 7. The locating bore 6 has the shape of a polygon as seen in FIG. 3. A ball coupling 8 serves as locking means. A connecting piece 9 overlapping the coupling piece 6 and carrying the centering pins 5 is connected by means of screws 10 to a gear housing 11 which is formed of two housing shells 11a, 11b and accommodates a gear unit 12 seen in FIG. 5. The gear unit 12 transmits the rotary movement of the coupling piece 7 to four milling spindles 13 that are to be rotated by a drive shaft and are disposed in such a way as to be offset by 90° relative to one another. A central gear shaft 14 is supported in the left-hand housing shell 11a through ball bearings 15 and in the right-hand housing shell 11b through ball bearings 16. There is a threaded connection 17 between the gear shaft 14 and the coupling piece 7. The threaded connection 17 ensures that a rotary and/or linear movement of the coupling piece 7 is transmitted free of play. Four gears 18 that are offset by 90° relative to one another mesh with a tooth system of the central gear shaft 14. The gears 18 have shaft stubs which are supported in the left-hand housing shell 11a through ball bearings 19 and in the right-hand housing shell 11b through ball bearings 20. The shaft stubs passing through the left-hand housing shell 11a are provided with a thread 21 through which a rigid connection is made with a flexible shaft 22. The shaft stubs form an output shaft of the housing 11 which is connected to the spindles 13 by the shaft 22. The end of the flexible shaft 22 that is remote or faces away from the left-hand housing shell 11a has a polygonal sliding connection which overlaps a sleeve 23 that is provided with an internal thread. The milling spindle 13 is screwed into the internal thread of the sleeve 23. The milling spindle 13 is supported in a ball-bearing housing 25 through a ball bearing 24 and in a bearing bush 27 through a needle bearing 26. The ball-bearing housing 25 has a threaded connection 28 which overlaps the bearing bush 27 and at the same time serves to set a clearance relative to a deflection body 29 and a cage 30. The deflection body 29, which can be recognized better in connection with FIG. 6, is clamped between a centering piece 32 and an intermediate piece 33 through a plurality of screws 31.

In a type of piston/cylinder connection, the intermediate piece 33 overlaps the gear housing 11. The intermediate piece 33 is connected to the gear housing 11 by a plurality of screws 35 while leaving a stroke "h", with a helical spring 34 in between in each case. The deflection body 29 has two projections 29a and 29b which are circular in cross-section and serve as centering means relative to the intermediate piece 33 and the centering piece 32. The center of the deflection body is constructed in such a way that it can accommodate the cage 30 which has a square cross-section. As is seen in FIG. 6, slots 36 that are offset by 90° relative to one another are made from this relieved center. In each case, the bearing bush or sleeve 27 that has an outer contour which is adapted to the shape of the slot 36 can be moved in a radially sliding manner in the slot. Thrust pieces 37, 38 limit the travel of the bearing sleeves 27 through the use of compression springs 41 bearing against abutments 39, 40. Spring-loaded guide bolts 42, 42a are let into the abutments 39. The abutments are connected to the deflection body 29 by countersunk screws 43. The milling spindles 13 passing through the bearing sleeves 27 also perform the sliding deflection movement of the bearing sleeves 27. A threaded connection 44 rigidly connects the respective milling spindle 13 to a locating part 45 for a milling cutter 46. The milling cutter is held by thrust pieces 47 which are pressed by a spring ring 48 in an annular groove 49.

Figure 4:
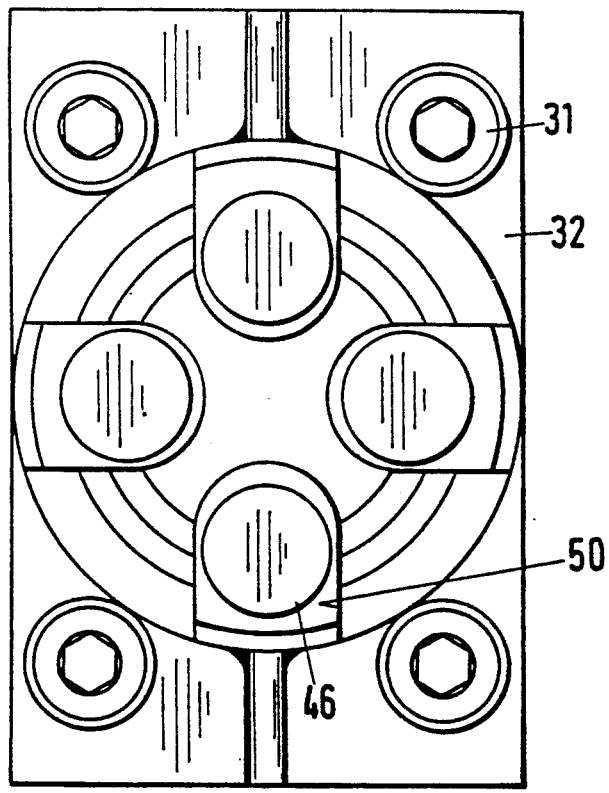
FIG. 4 is an elevation view of the component having the counterbore omitted, as seen along the direction of an arrow IV in FIG. 1.

FIG. 4 reveals that the centering piece 32 also has recesses 50 which permit a radial movement of the milling cutter. The displacement movement of the bearing sleeves 27 is controlled by a control rod 51 which is screwed into the left-hand housing shell 11a and extends through the cage 30. Passing through the wall of the cage are cams 52 which can be moved in the radial direction by a V-shaped annular groove 53 in the control rod 51. The housing shells 11a, 11b are interconnected by screws 54 seen in FIG. 5. A slot-and-key connection 55 that is likewise shown in FIG. 5 serves as anti-rotation locking means between the housing 11 and the intermediate piece 33.

The function of the device is described below. The coupling piece 7 is set in rotation by the drive means 4 indicated by phantom lines, so that this rotary movement is transmitted through the gear unit 12 to the milling spindle 13. At the same time, a linear movement of the coupling piece 7 and thus of the entire device takes place until the end surface of the centering piece 32 runs up against the base surface of the component at the counterbore. Upon further linear movement of the coupling piece 7, only the gear housing 11, the control rod 51 and the flexible shaft 22 move. This relative movement takes place against the force of the compression spring 34 until the stroke "h" between the intermediate piece 33 and the gear housing 11 is overcome. The linear movement of the flexible shaft 22 is turned into a relative movement by the polygonal sliding connection between the sleeve 23 and a hub 22a of the flexible shaft 22 which overlaps the sleeve. The V-shaped annular groove 53 in the control rod 51 leads to a continuous radial movement of the cams 52 during the above-mentioned relative movement. As a result, they simultaneously push all four bearing sleeves 27 outwards together with the milling spindles 13 and the milling cutters 46.

In this configuration, the stroke "h" and the slope of the V-shaped annular groove are set in such a way that the predetermined milling depth of the dimples is reached after the stroke is overcome. During the linear retraction of the coupling piece 7, the cams 52 move back again into their original position, with the compression springs reliably bringing about the follow-up movement of the bearing sleeves 27. The compression springs 34 disposed between the housing and the intermediate piece 33 help to establish the original stroke distance "h". Damage to the milling cutter during retraction of the device is therefore impossible.

We claim:

1. A device for forming a plurality of dimples in a cylindrical wall, comprising a deflection body, a central control rod having a first end and a second free end, milling spindles to be rotated by a drive shaft, said milling spindles being disposed planet-like relative to said central control rod and passing through said deflection body, said milling spindles corresponding in number to dimples to be simultaneously formed in a cylindrical wall of a counterbore in a component having a base surface of the counterbore, milling cutters disposed on said milling spindles, a centering piece facing the counterbore and being connected to said deflection body, an intermediate piece facing away from the counterbore and being connected to said deflection body, a gear housing having a piston/cylinder type connection with said intermediate piece and having an output shaft, said first end of said control rod being fastened to said gear housing, said second free end of said control rod projecting into said deflection body, axially movably guided flexible shafts connecting said milling spindles to said output shaft of said gear housing, bearing sleeves carrying said milling spindles and being radially movably mounted in said deflection body, and drive means for axially displacing said control rod relative to said deflection body with an axial relative movement between said gear housing and said intermediate piece in the course of a predeterminable stroke, after said centering piece contacts the base surface of the counterbore, and simultaneously moving said milling spindles radially outwardly in the vicinity of said deflection body.

2. The device according to claim 1, including a central gear shaft, and a coupling piece being connected to said central gear shaft and leading to a rotary drive for the device.

3. The device according to claim 1, including means for developing a counterforce opposing the stroke between said gear housing and said intermediate piece, and a stop limiting the stroke.

4. The device according to claim 1, wherein said control rod has a given number of annular grooves with a V-shaped cross-section formed therein, said given number is at least one, and including said given number of cams each being associated with a respective one of said bearing sleeves, and a cage guiding said control rod, said cams passing radially through said cage.

5. The device according to claim 1, wherein said deflection body has radial guides for receiving said bearing sleeves, and a ball-bearing housing associated with said bearing sleeves and serving as axial-securing means.

6. The device according to claim 1, including abutments, and spring-mounted thrust pieces associated with said deflection body, each of said thrust pieces being disposed opposite a respective one of said abutments.

7. A device for forming a plurality of dimples in a cylindrical wall, comprising a deflection body, a central control rod having a first end and a second free end, milling spindles being distributed about said central control rod and passing through said deflection body, said milling spindles corresponding in number to dimples to be simultaneously formed in a cylindrical wall of a counterbore in a component having a base surface of the counterbore, milling cutters disposed on said milling spindles, a centering piece being connected to said deflection body and facing the counterbore for contacting the base surface of the counterbore, an intermediate piece facing away from the counterbore and being connected to said deflection body, a gear housing being connected to said intermediate piece and having an output shaft, said first end of said control rod being fastened to said gear housing, said second free end of said control rod projecting into said deflection body, axially movable flexible shafts connecting said milling spindles to said output shaft of said gear housing, bearing sleeves carrying said milling spindles and being radially movable in said deflection body, and drive means for axially displacing said control rod relative to said deflection body with an axial relative movement between said gear housing and said intermediate piece in the course of a predeterminable stroke, and simultaneously moving said milling spindles radially outwardly in the vicinity of said deflection body.

* * * * *